July 31, 1962     B. S. HUTCHINS     3,047,258
PARACHUTE COLLAPSING AND RETRIEVAL DEVICE
Filed Aug. 1, 1961     2 Sheets-Sheet 1
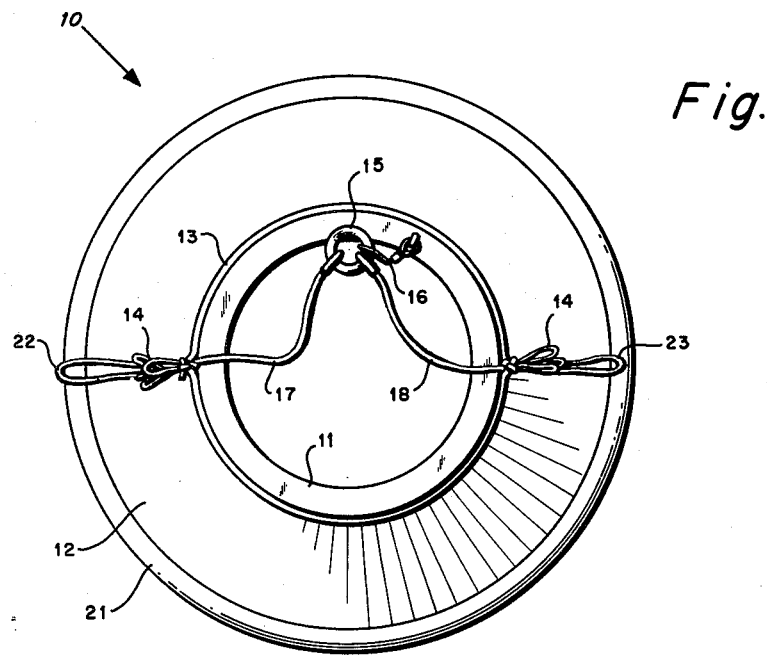
Fig. 2
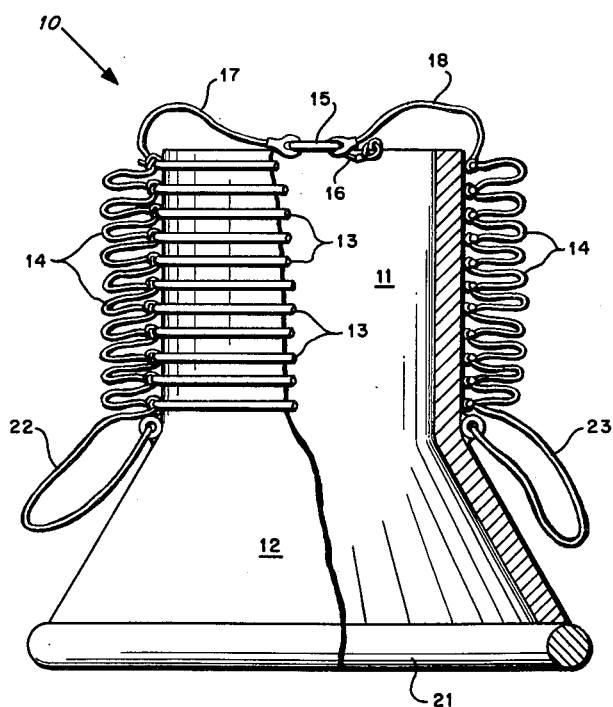
Fig. 1
INVENTOR.
BLANCHARD S. HUTCHINS
BY 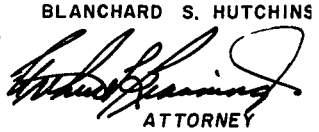
ATTORNEY

United States Patent Office 3,047,258
Patented July 31, 1962

3,047,258
PARACHUTE COLLAPSING AND
RETRIEVAL DEVICE
Blanchard S. Hutchins, Warrington, Pa., assignor to the United States of America as represented by the Secretary of the Navy
Filed Aug. 1, 1961, Ser. No. 128,600
7 Claims. (Cl. 244—137)
(Granted under Title 35, U.S. Code (1952), sec. 266)

The invention described herein may be manufactured and used by or for the Government of the United States of America for governmental purposes without the payment of any royalties thereon or therefor.

This invention relates to parachute retrieval devices, and more particularly to a device for collapsing and retrieving parachutes for use with a helicopter.

The general purpose of this invention is to provide for the safe recovery of cargo-type parachutes from the sea. In the past, aerial recovery of parachutes has been so hazardous as to be impractical. Thus, parachutes once used over the water were generally abandoned. The cost resulting from abandoning cargo-type parachutes (70 feet in diameter and 30 feet high) is excessive particularly in view of the fact that these types of parachutes cost of the order of $500 each.

This invention contemplates a device and method for retrieving parachutes from the water thereby enabling such to be used over to eliminate the necessity of procuring a new parachute for each drop. Particularly in the recovery of the cargo-type parachute used to lower a target drone to a safe landing on water, the saving afforded the Government would approximate several thousand dollars per year.

This invention contemplates the aerial recovery of parachutes by the use of a novel cone structure by which the parachute may be safely collapsed and secured at intervals along the length thereof for transport back to a base. By collapsing and securing the parachute, the hazardous condition of billowing caused by downwash of a helicopter is substantially eliminated.

In the method of this invention a helicopter carrying the novel cone structure equipped with bungee cords of this invention assumes a hover position over the parachute to be recovered. When the helicopter is in a hover position near the parachute in the water, a retrieval line attached to the apex of the parachute is passed through the cone. The cone is then dropped and the retrieval process is started when an initiating ring on the cone comes in contact with a second ring near the apex of the parachute. The helicopter slowly raises up and the bungee cords are deposited around the parachute every two feet. The parachute, collapsed by the cone and secured by the bungee cords, is then ready for transport back to a base.

Therefore, it is an object of the present invention to provide a device for the safe recovery of a parachute from the water by a helicopter.

Another object of the present invention is to provide a device used from a helicopter for collapsing and securing the parachute as it is retrieved from the water.

A further object of the invention is to provide a device used by a helicopter to safely recover a parachute from the water by securing the parachute in a collapsed condition to thereby substantially eliminate hazards due to parachute billowing as caused by helicopter downwash.

Still another object is to provide a method of parachute retrieval utilizing the novel cone structure arrangement of this invention.

The exact nature of this invention as well as other objects and advantages thereof will be readily apparent from consideration of the following specification relating to the annexed drawings in which:

FIG. 1 is an elevational view partially broken away of the device of this invention showing the bungee cord and spacer arrangement.

FIG. 2 is a top view of the device of this invention showing the initiating ring.

Figure 3:
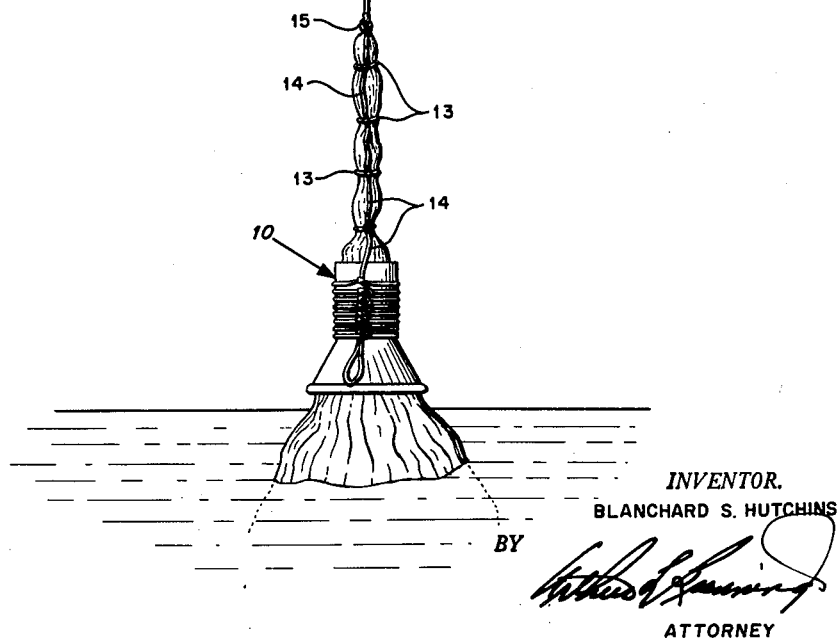
FIG. 3 is an illustration depicting a partially completed parachute recovery operation utilizing the device of this invention.

Referring now to the drawings there is shown in FIGS. 1 and 2 a bell-shaped, hollow retrieval device 10. The bell-shaped retrieval device 10 is hereinafter referred to as a cone although it is not in the mathematical sense a true cone. The upper portion 11 is cylindrical in shape and forms an opening at the top. The lower portion which is integral and coextensive with the upper portion 11 is conical in shape and forms an opening at the bottom. The angle that the wall of the upper portion 11 makes with the lower conical portion 12 is of the order of 150 degrees.

The dimensions of the cone which may vary somewhat in actual practice are given as follows. The diameter of the upper cylindrical portion 11 is 20 inches. The smaller diameter of the lower conical portion 12 is 20 inches, while the larger diameter is 36 inches. The overall length from top to bottom of the cone is 27 inches with the cylindrical upper portion 11 being 15 inches in length while the conical lower half portion 12 is 12 inches in length.

Encircling the outside diameter of the cylindrical upper portion 11 is a plurality of bungee cords 13. The exact number of bungee cords depends on the size of the parachute that is to be retrieved. Each bungee cord is connected to the next adjacent bungee cord by two nylon spacer cords 14 which are opposite one another on the periphery of the cylindrical upper portion 11. Each nylon spacer cord 14 is approximately 2 feet in length and in the inactive state as shown form loops. In the activated state, that is, with the bungee cords around a collapsed parachute the spacer cords 14 are taut and effectively limit the distance between bungee cords along the length of the parachute to 2 feet.

A metal ring 15 is attached to the wall of the cylindrical upper portion 11 as by wire 16 and has secured thereto two nylon cords 17 and 18. The other ends of the nylon cords 17 and 18 are secured to the uppermost bungee cord on opposite sides of the diameter of cylindrical upper portion 11. The lowermost bungee cord is secured to the cone 10 by nylon cords 22 and 23.

The cone 10 may be made of a lightweight material such as aluminum and weighted down as by a lead weight 21 secured around the periphery of the lower portion 12. The preferred weight of the cone is thirty pounds.

FIGURE 3 depicts a helicopter in the act of retrieving a parachute using the cone 10. The method of collapsing and retrieving a parachute from the water is described hereinbelow.

A helicopter carrying the retrieval cone of this invention on sighting a parachute assumes a hover position over it. The retrieval line is passed through the cone 10 and ring 15 and is secured at one end to an outrigger mounted on the side of the helicopter. The other end of the retrieval line is attached to the apex of the parachute to be retrieved. When this attachment is secure, the retrieval cone is dropped. As the helicopter then rises, the parachute is drawn through the retrieval cone 10 and a metal ring on the retrieval line near the apex of the parachute contacts the ring 15 to cause the wire 16 to be snapped. As the helicopter slowly rises, the special configuration of the cone collapses the parachute as the parachute is drawn up through the retrieval cone. At the same time the ring on the retrieval line near the apex of the parachute forces the ring 15 upward relative to the cone. This, in turn, causes the bungee cords to be slipped off the cone one by one and onto the collapsed parachute to secure the parachute in the collapsed condition at two foot intervals along the length of the parachute.

The actual recovery operation and the cone of this invention was originally conceived to recover the cargo-type parachute used to lower a target drone safely into the water. In this specific situation the line connecting the drone and the apex of the parachute is located by the helicopter. The line is then brought up into the helicopter itself where it is cut from the drone. The line which is attached to one end to the apex of the parachute is then threaded through the ring 15 of the cone 10 and attached to an outrig on the side of the helicopter.

The parachute used to safely drop the target drone is equipped with a metal ring secured close to the apex of the parachute on the retrieval line. Therefore, as the cone is dropped, the ring secured to the line comes in contact with the ring 15 of the retrieval cone. This contact is such as to break the securing wire 16 and begin the actual operation of collapsing and securing the parachute.

When the last bungee cord is pulled off the cylindrical portion of the cone, the retrieval operation is complete. The cone itself is securely attached to the last bungee cord by previously mentioned cords 22 and 23 so that when the helicopter has completed the collapsing and securing operation, the parachute and retrieval cone are carried back to the base.

In the absence of the second ring to contact ring 15, other convenient means may be employed to initiate the recovery operation. However, since this invention is to be used on a Navy-wide scale, all cargo type parachutes to be recovered will have a ring included in the pack.

What is claimed is:

1. A device for use by a helicopter for recovering parachutes from the water, comprising in combination: a hollow retrieval cone having openings at both ends, elastic means disposed about the outside periphery of said cone, initiating means, and means connecting said initiating means to said elastic means whereby said elastic means are pulled off said cone and disposed about a parachute passing through said cone when said initiating means are activated.

2. A device for use by a helicopter for recovering parachutes from the water, comprising in combination: a hollow retrieval cone having openings at both ends to accommodate passage of a parachute therethrough, a plurality of bungee cords encircling said retrieval cone with each of said bungee cords being parallel to adjacent ones of said bungee cords, first cord means securing the lowermost of said plurality of bungee cords to said retrieval cone, at least one spacer cord secured at opposite ends to each of adjacent ones of said plurality of bungee cords, an initiating ring, breakable wire means securing said ring to said cone, and second cord means securing said ring to the uppermost of said plurality of bungee cords whereby said bungee cords are pulled off said cone and disposed at intervals about a parachute passing through said cone when said initiating ring is activated.

3. A parachute collapsing and retrieval device, comprising in combination: a bell-shaped shell open at both ends, said shell comprising a cylindrical upper portion and a conical lower portion integrally joined at its smaller diameter to said cylindrical upper portion and coextensive therewith, elastic means disposed about the outside periphery of said cylindrical upper portion of said shell, initiating means, and means connecting said initiating means to said elastic means whereby said elastic means are pulled off said cylindrical upper portion and disposed about a parachute passing through said shell when said initiating means are activated.

4. A parachute collapsing and retrieval device, comprising in combination: a bell-shaped shell open at both ends, said shell comprising a cylindrical upper portion and a conical lower portion integrally joined at its smaller diameter to said cylindrical upper portion and coextensive therewith, a plurality of bungee cords encircling said cylindrical upper portion of said shell with each of said bungee cords being parallel to adjacent ones of said bungee cords, first cord means securing the lowermost of said plurality of bungee cords to said shell, at least one spacer cord secured at opposite ends to each of adjacent ones of said plurality of bungee cords, an activating ring, breakable wire means securing said ring to said shell, and second cord means securing said ring to the uppermost of said plurality of bungee cords.

5. A method of recovering a used parachute from the water by a helicopter, comprising the steps of: grasping a retrieval line attached to the apex of the parachute, drawing the parachute upwards through a collapsing cone, and tying the parachute at equal intervals along its length.

6. A method of recovering a spent parachute from the water by a helicopter, comprising the steps of: grasping a retrieval line attached to the apex of the parachute, dropping a retrieval cone down the retrieval line, slowly raising the parachute to pass through said retrieval cone, collapsing the parachute, and securing the collapsed parachute at equal intervals along its length.

7. A method of retrieving a parachute from the water by a helicopter, comprising the steps of: connecting a retrieval line to the apex of the parachute, slowly raising the parachute from the water, collapsing the parachute, and securing the parachute at equal intervals along its length.

References Cited in the file of this patent

UNITED STATES PATENTS

| 2,700,781 | Smith | Feb. 1, 1955 |
| 2,738,939 | Johnson | Mar. 20, 1956 |

OTHER REFERENCES

"Aviation Week," page 33, June 8, 1959, vol. No. 70, Issue No. 23.